(12) United States Patent
Cai

(10) Patent No.: US 8,351,336 B2
(45) Date of Patent: Jan. 8, 2013

(54) ARBITRATION OF MEASUREMENT GAP COINCIDENCE WITH RANDOM ACCESS

(75) Inventor: Zhijun Cai, Irving, TX (US)

(73) Assignee: Motorola Mobility LLC, Libertyville, IL (US)

( * ) Notice: Subject to any disclaimer, the term of this patent is extended or adjusted under 35 U.S.C. 154(b) by 350 days.

(21) Appl. No.: 12/535,577

(22) Filed: Aug. 4, 2009

(65) Prior Publication Data

US 2010/0027438 A1 Feb. 4, 2010

Related U.S. Application Data

(60) Provisional application No. 61/086,076, filed on Aug. 4, 2008.

(51) Int. Cl.
*H04L 12/26* (2006.01)

(52) U.S. Cl. ........................................ 370/241; 370/252

(58) Field of Classification Search .................. 370/241, 370/252
See application file for complete search history.

(56) References Cited

U.S. PATENT DOCUMENTS

| 6,611,233 | B2 * | 8/2003 | Kimura | 342/458 |
| 2008/0207196 | A1 * | 8/2008 | Pettersson | 455/424 |
| 2008/0253323 | A1 * | 10/2008 | Fischer | 370/329 |

FOREIGN PATENT DOCUMENTS

WO 2008055235 A2 5/2008

OTHER PUBLICATIONS

3GPP TS 36.300v8.5.0; 3rd Generation Partnership Project; Technical Specification Group Radio Access Network; Evolved Universal Terrestrial Radio Access (E-UTRA) and Evolved Universal Terrestrial Radio access Network (E-UTRAN); Overall Description; Stage 2; Release 8; May 2008; 134 pgs.
3GPP TS 36.321v8.2.0; 3rd Generation Partnership Project; Technical Specification Group Radio Access Network; Evolved Universal Terrestrial Radio Access (E-UTRA) Medium Access Control (MAC) Protocol Specification; Release 8; May 2008; 33 pgs.
Ericsson; TSG-RAN WG2 Meeting #62bis; Title: UL Transmissions During Measurement Gaps; R2-083355; Warsaw, Poland, Jun. 30-Jul. 4, 2008; 2 pgs.
Phillips, NXP Semiconductors; 3GPP TSG-RAN WG2#62; Title: Control of HARQ for RACH Message 3; R2-082452; Kansas City, USA; May 5-9, 2008; 5 pgs.
PCT International Search Report; PCT Application No. PCT/US2009/052740; Nov. 17, 2009; 4 pgs.
PCT Written Opinion of the International Searching Authority; PCT Application No. PCT/US2009/052740; Nov. 17, 2009; 7 pgs.

* cited by examiner

*Primary Examiner* — Yemane Mesfin
*Assistant Examiner* — Mon Cheri Davenport

(57) ABSTRACT

A user agent is provided. The user agent is configured to perform a random access procedure and to perform radio measurements. The random access procedure comprises deciding when to send a random access preamble based on a possible occurrence of a measurement gap, transmitting a random access preamble on an uplink, and monitoring a physical downlink control channel for a random access response.

14 Claims, 14 Drawing Sheets

ARBITRATION OF MEASUREMENT GAP COINCIDENCE WITH RANDOM ACCESS

CROSS-REFERENCE TO RELATED APPLICATIONS

The present application claims priority to U.S. provisional patent application No. 61/086,076, filed Aug. 4, 2008, by Zhijun Cai, entitled "Arbitration of Measurement Gap Coincidence with Random Access", which is incorporated by reference herein as if reproduced in its entirety.

BACKGROUND

As used herein, the terms "user agent" and "UA" can refer to mobile devices such as mobile telephones, personal digital assistants, handheld or laptop computers, and similar devices that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UA" may also refer to devices that have similar capabilities but that are not transportable, such as desktop computers, set-top boxes, or network nodes. A UA might communicate with a second UA, some other element in a telecommunications network, an automated computing device such as a server computer, or some other device. A communications connection between a UA and another component might promote a voice call, a file transfer, or some other type of data exchange, any of which can be referred to as a call or a session.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved node B (ENB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station or an LTE ENB that can provide a UA with access to other components in a telecommunications system. In the EPS system, a user agent is referred to as user equipment.

Some UAs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers. Voice over Internet Protocol (VoIP) is a well-known system for packet switched-based voice communication over the Internet. The term "VoIP" will refer herein to any packet switched voice call connected via the Internet, regardless of the specific technology that might be used to make the call.

For a wireless VoIP call, the signal that carries data between a UA and an access device can have a specific set of frequency, code, and time parameters and other characteristics that might be specified by the access device. A connection between a UA and an access device that has a specific set of such characteristics can be referred to as a resource. An access device typically establishes a different resource for each UA with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
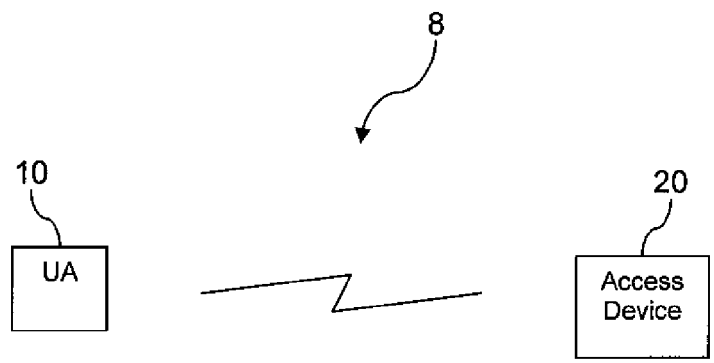
FIG. 1 is an illustration of a telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a user agent is disclosed. The user agent is configured to perform a random access procedure and to perform radio measurements. The random access procedure comprises deciding when to send a random access preamble based on a possible occurrence of a measurement gap, transmitting a random access preamble on an uplink, and monitoring a physical downlink control channel for a random access response.

In an alternative embodiment, a method of wireless communication is disclosed. The method comprises a user agent performing radio measurements, and the user agent performing a random access procedure. The random access procedure comprises deciding when to send a random access preamble based on a possible occurrence of a measurement gap, transmitting a random access preamble on an uplink, and monitoring a physical downlink control channel for a random access response.

A user agent (UA) may conduct a random access procedure with an access device that comprises sending and receiving a plurality of messages. The UA may also perform radio measurements, for example periodic measurements of the radio conditions associated with a plurality of inter-radio access technologies (inter-RATs) and/or a plurality of frequencies. In some embodiments, the radio measurements may not be periodic but may be performed at times determined, for example, by the access device or the UA. The radio measurements may be performed during a measurement gap. In some embodiments of the UA, both the random access procedure and the radio measurements may require dedicated use of the same radio transceiver of the UA. In the event of coincidence of the random access procedure and the radio measurements, the present disclosure describes several possible conflict resolution solutions. In a first embodiment, the random access procedure has precedence over the radio measurements. If the radio measurements are in progress when the random access procedure is triggered, the radio measurements are postponed or cancelled. If the random access procedure is in progress and the radio measurements are triggered, the radio measurements are cancelled or postponed. In a second embodiment, the radio measurements have precedence over the random access procedure. If the random access procedure is in progress when the radio measurements are triggered, the random access procedure is canceled or postponed. If the radio measurements are in progress and the random access procedure is triggered, the random access procedure is postponed. In a third embodiment, the precedence is split between the random access procedure and the radio measurements. For example, completing the first two messages of the random access procedure have precedence over the radio measurements, but the radio measurements have precedence over the third and later messages of the random access procedure.

FIG. 1 illustrates an embodiment of a wireless telecommunications system 8 that includes a UA 10 capable of communicating with an access device 20 or a similar component. Transmissions of various types of information can take place between the UA 10 and the access device 20. For example, the UA 10 might send the access device 20 various types of application layer data such as VoIP data packets and data packets containing information related to web browsing, emailing, and other user applications, all of which may be referred to as user plane data. Other types of information related to the UA's application layer will be familiar to one of skill in the art. Any signal containing such information will be referred to herein as a data signal. Information associated with a data signal will be referred to herein as user plane data.

The UA 10 might also send the access device 20 various types of control signaling such as layer 1 scheduling requests, layer 2 radio resource control (RRC) messages and mobility measurement messages, and other control messages, all of which may be referred to as control plane data, and is familiar to one of skill in the art. The UA 10 typically generates such messages as needed to initiate or maintain a call. Any such signal will be referred to herein as a control signal. Information associated with a control signal will be referred to herein as control plane data.

Figure 2:
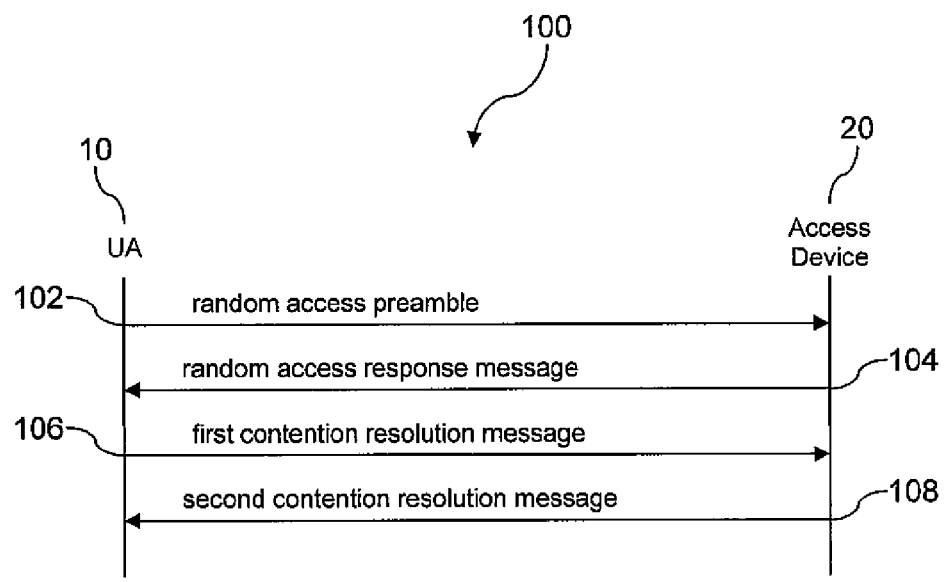
FIG. 2 is a message sequence diagram illustrating a random access procedure message exchange according to an embodiment of the disclosure.

Turning now to FIG. 2, a message sequence 100 is discussed. The message sequence 100 is an idealized view of the random access procedure in a EPS system. One skilled in the art will appreciate that a random access procedure in another system may use different terminology, however, the concepts are the same. In an embodiment, the random access procedure begins with the UA 10 selecting a random access preamble and the physical random access channel (PRACH) resources. The UA 10 then transmits a random access preamble 102 to the access device 20. After transmitting the random access preamble 102, the UA 10 monitors the physical downlink control channel (PDCCH) in each transmission time interval (TTI), for example from the RA_WINDOW_BEGIN time interval to the RA_WINDOW_END time interval. In some contexts, the random access procedure may be referred to as a random access process.

The access device 20 transmits a random access response message 104 to the UA 10. In some contexts, the random access response message 104 may be described as a random access response over the Physical Downlink Shared Channel (the related control signaling such as the assigned resource is delivered over the PDCCH). The UA 10 starts contention resolution by sending a first contention resolution message 106 on the uplink to the access device 20. After transmitting the first contention resolution message 106, the UA 10 monitors the downlink. The access device 20 transmits a second contention resolution message 108 on the downlink to the UA 10. The random access process may be triggered by various events. As an example, the UA 10 may execute an application that needs a radio link to provide its subject functionality, for example to transmit an electronic mail message or to initiate a voice call, and this may trigger the UA 10 to execute the random access process to establish a wireless link with the access device 20.

The UA 10 measures various radio conditions related to wireless communications. For example, the UA 10 may use a transceiver to monitor pilot signals transmitted by a plurality of access devices using different radio access technologies (RATs). This may be referred to as performing inter-RAT measurements. Additionally, the UA 10 may use the transceiver to monitor pilot signals transmitted on a plurality of different frequencies of a single radio access technology. This may be referred to as performing inter-frequency measurements. The UA 10 may measure a received signal strength of the pilot signals and report this measurement back to one or more access devices 20. In an embodiment, these measurements may be used by the access devices 20 to hand off the UA 10 from a first access device 20 to a second access device 20, for example as the UA 10 roams out of the coverage area of the first access device 20 into the coverage area of the second access device 20. In another embodiment, these measurements may be used to allocate resources to the UA 10 and/or to configure various communications parameters of the UA 10 and/or the access device 20. These measurements may be referred to in some contexts as radio measurements and/or as a measurement of radio conditions process. In some embodiments and/or operating conditions, the radio measurements may occur on a periodic basis. In some contexts, the activity of determining radio measurements and/or communicating the radio measurements to the access device 20 may be referred to as a measurement process. In some embodiments, the measurement process may be triggered by an event. For example, the expiration of a timer may be used to trigger the measurement process. In an embodiment, the access device 20 may send a message to the UA 10 to configure the timer that triggers the measurement process to occur. In another embodiment, some other event may trigger the measurement process.

Because both the random access process and the measurement process may depend upon exclusive use of the transceiver of the UA 10, in an embodiment the random access process and the measurement process may not occur concurrently. When it happens that the random access process and the measurement process would occur or are scheduled to occur at the same time, for example when the UA 10 would otherwise perform both the random access process and the measurement process in the next transmission time interval or other imminent time interval, the UA 10 employs a procedure and/or method for arbitrating access to the transceiver of the UA 10. In practice, the resolution of the conflict is for the UA 10 to grant precedence to one of the processes over the other or to grant a partial precedence of one of the processes over the other. These different conflict resolution methods may have different advantages and short comings in different wireless communication operating environments. A first one of the conflict resolution methods may be preferred in a first wireless communication environment, while a second one of the conflict resolution methods may be preferred in a second wireless communication environment. Each of these conflict resolution approaches and/or methods are contemplated by the present disclosure.

Figure 3A:
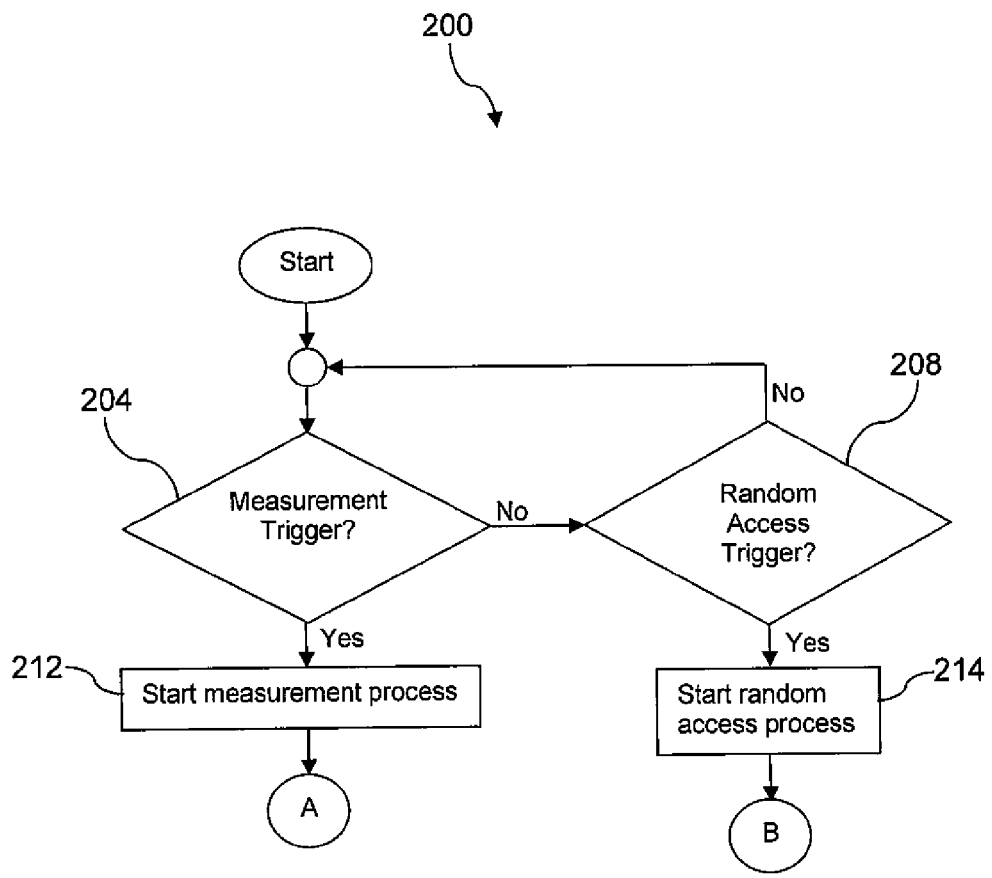
FIG. 3A, FIG. 3B, and FIG. 3C depict a flow chart of a method according to an embodiment of the disclosure.
Figure 3B:
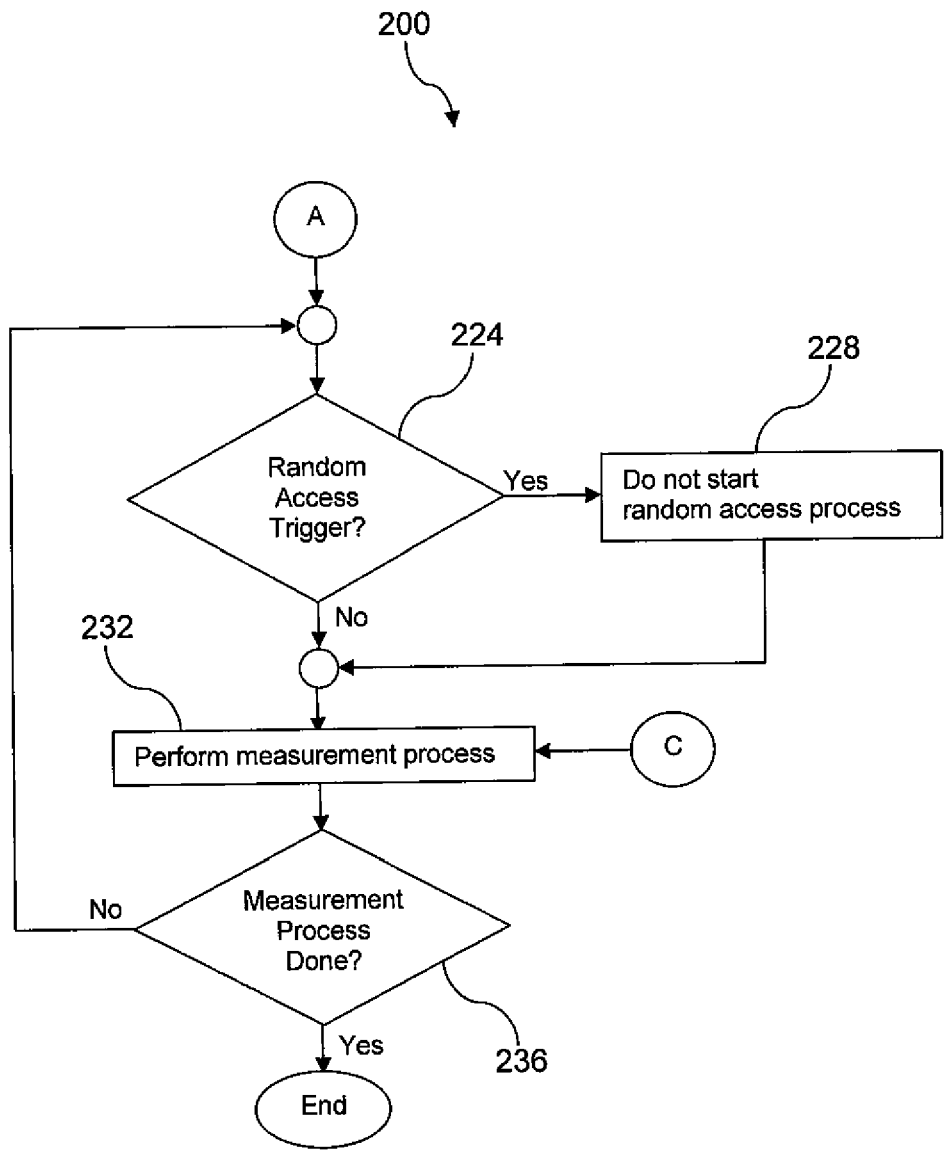
Figure 3C:
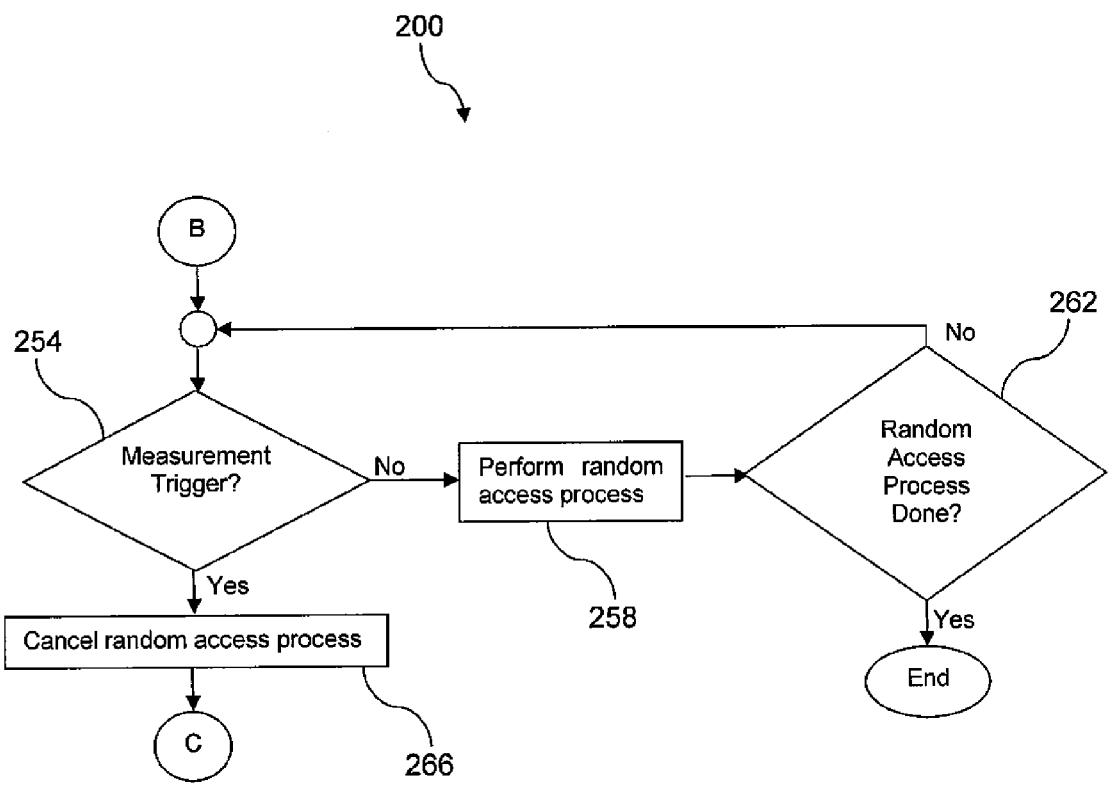

Turning now to FIG. 3A, FIG. 3B, and FIG. 3C, a method 200 is discussed. The flowchart provided in FIG. 3A, FIG. 3B, and FIG. 3C is a logical characterization of a method to arbitrate a coincidence between a measurement process and a random access process and may be said to grant precedence to the measurement process over the random access process. One skilled in the art will recognize that there may be multiple alternative ways to implement the steps depicted in the flow chart, for example to optimally use an electronic processor and/or to conserve limited memory efficiently. Additionally, minor modifications of the logical flow depiction would occur to those skilled in the art, for example trivial transpositions of functional blocks that do not alter the end result of the method. All such alternatives and modifications are contemplated by the present disclosure.

At block 204, if a measurement process triggering event has occurred, the method 200 proceeds to block 212 where the measurement process is started. If no measurement process triggering event has occurred, the method 200 proceeds to block 208 where if a random access process triggering event has occurred, the method 200 proceeds to block 214 where the random access process is started. If no random access process triggering event has occurred, the method 200 returns to block 204. In the absence of either a measurement process triggering event or a random access process triggering event, the method 200 continues to loop through blocks 204 and 208. While the logical description above suggests a busy waiting operation in the absence of any triggering events, one skilled in the art will readily recognize that the depicted logical operation can be trivially mapped to efficient codes, subroutines, and/or interrupt service routines which do not suffer from the inefficiency of busy waiting. For example, in an embodiment, one or both of the blocks 204, 208 may be implemented as an interrupt service routine that is invoked based on a triggering event.

If block 212 has been performed, the method 200 proceeds to block 224 in FIG. 3B. The logic depicted in FIG. 3B can be considered to be an operational state or mode of the UA 10, the state of the measurement process in progress. At block 224 if a random access process triggering event has occurred the method 200 proceeds to block 228 where the random access process is not started. The method 200 then proceeds to block 232 where the measurement process is performed and/or completed. At block 236, if the measurement process is done, the method 200 ends. At block 236, if the measurement process is not done, the method 200 returns to block 224. By looping through blocks 224, 228, 232, and 236 the measurement process is completed. The repeated looping is intended to convey the possibility of processing a plurality of instructions in the course of performing the measurement of radio conditions and/or repeating measurements on each of a plurality of different radio access technologies and/or frequencies. One skilled in the art will readily appreciate that the blocks 224 and 228 may be dropped out of the method 200, for example if the measurement process and the random access process are implemented as interrupt service routines and the measurement process is implemented as a higher priority than the random access process.

In FIG. 3A, if block 214 has been performed, the method 200 proceeds to block 254 in FIG. 3C. The logic depicted in FIG. 3C can be considered to be an operational state or mode of the UA 10, the state of the random access process in progress. At block 254, if a measurement process triggering event has occurred the method 200 proceeds to block 266 where the random access process is canceled and/or stopped. From block 266, the method 200 proceeds to block 232 in FIG. 3B, where the measurement process is performed, as discussed above. If no measurement process triggering event has occurred, the method 200 proceeds to block 258 where the random access process is performed. The method 200 proceeds to block 262 where if the random access process is done, the method 200 ends. If the random access process is not done, the method 200 returns to block 254. By looping through blocks 254, 258, and 262, the random access process is completed. The repeated looping is intended to convey the possibility of processing a plurality of instructions in the course of performing the random access process.

As already mentioned above, one skilled in the art will recognize that the flow chart depicted in FIG. 3A, FIG. 3B, and FIG. 3C is a logical depiction of the processing that occurs. This logic can be implemented in code, subroutines, and/or interrupt service routines in a variety of ways to achieve processing and/or memory utilization efficiencies that are well known to those skilled in the embedded systems programming and wireless communications arts, all of which are contemplated by the present disclosure. Some suggestions are made above to indicate some of the differences that may occur between the logical depiction and the implementation in practical low-level code deployed on an electronic device, but considerations of brevity militate against an exhaustive enumeration of these alternatives, which in any case are well known in the art.

The functionality of method 200 may alternatively be stated succinctly as: when a random access process is in progress and when a measurement triggering event occurs, cancel the random access process and perform the measurement of radio conditions; and when the measurement or radio conditions is in progress and when a random access process triggering event occurs, continue performing the measurement of radio conditions.

Figure 4A:
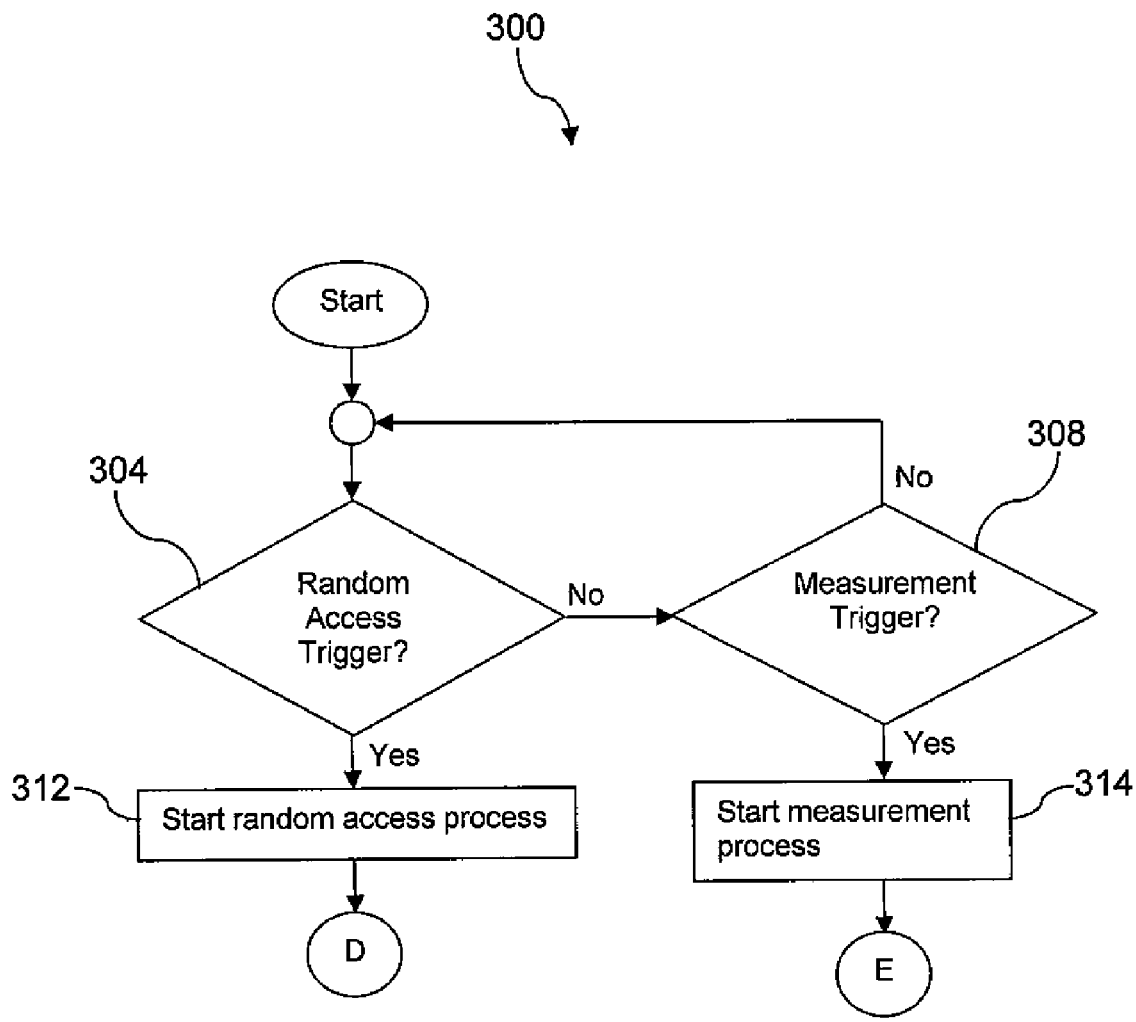
FIG. 4A, FIG. 4B, and FIG. 4C depict a flow chart of another method according to an embodiment of the disclosure.
Figure 4B:
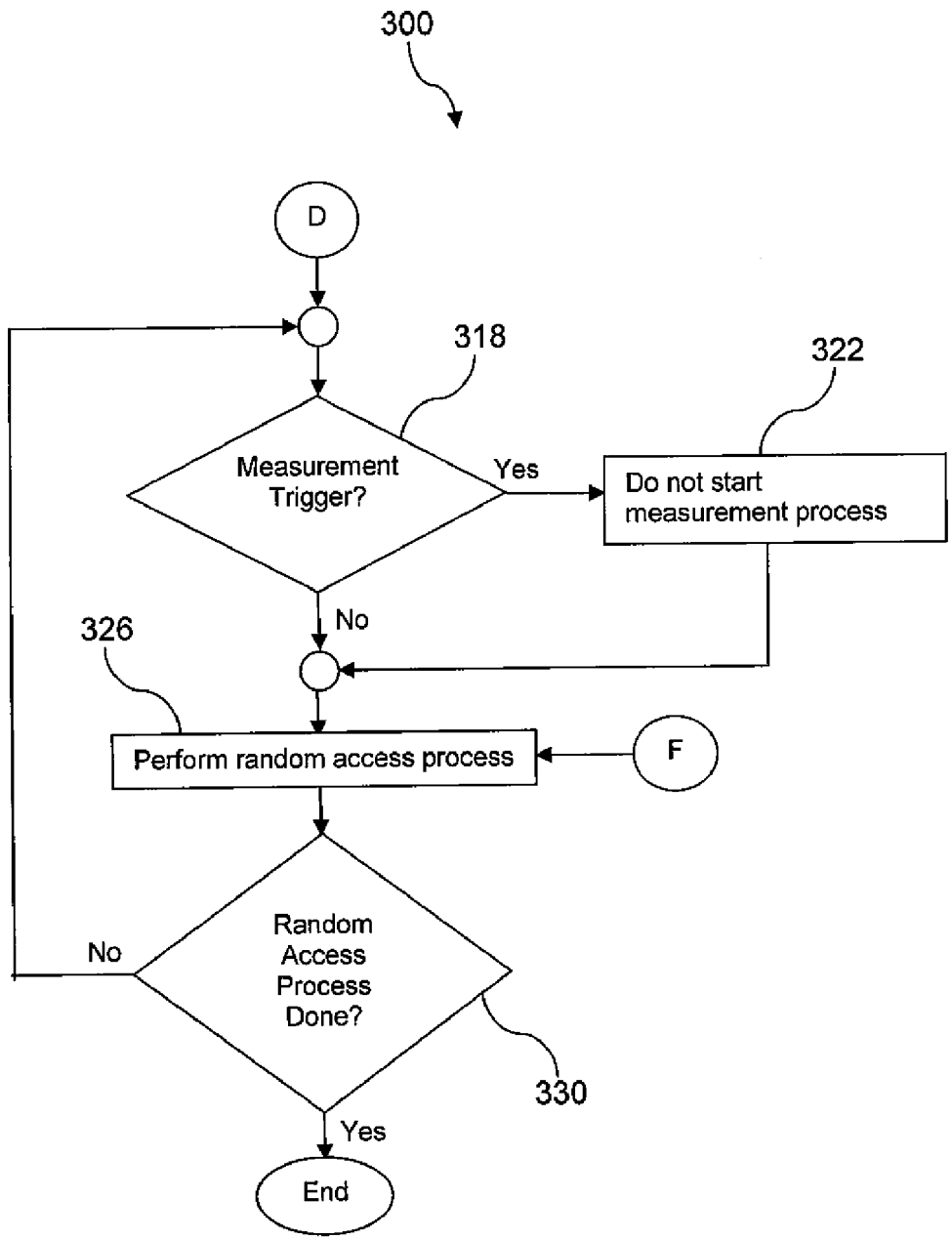
Figure 4C:
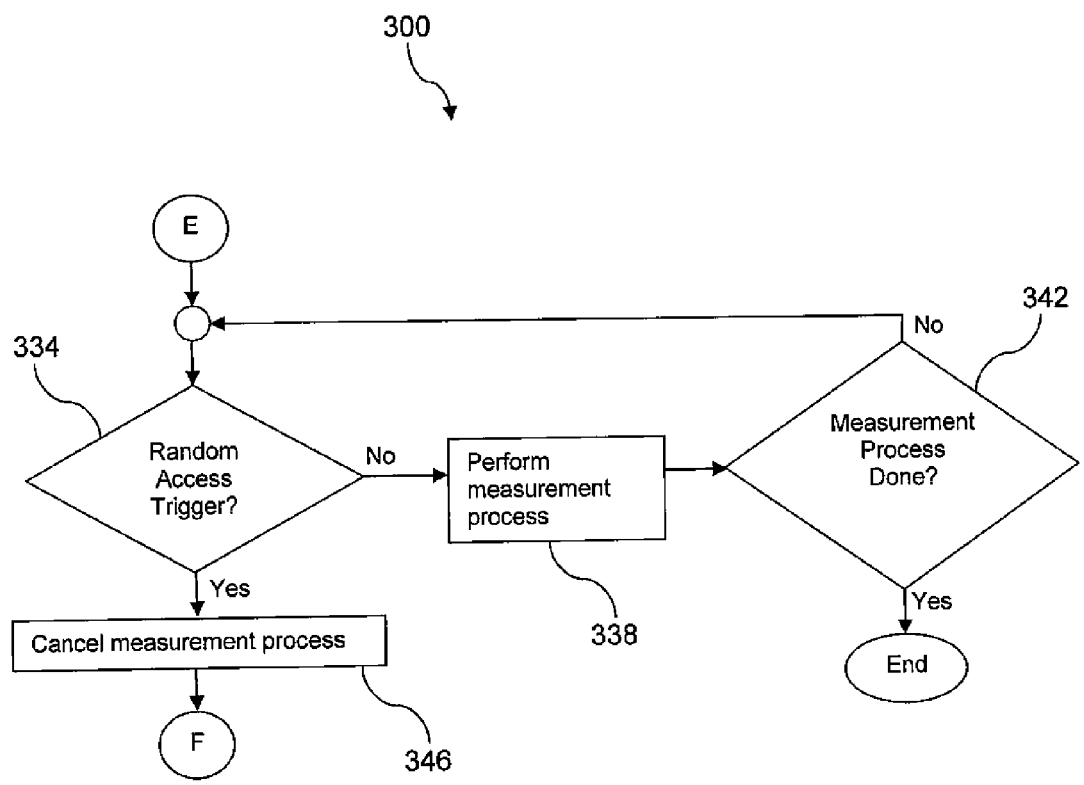

Turning now to FIG. 4A, FIG. 4B, and FIG. 4C, a method 300 is discussed. The flowchart provided in FIG. 4A, FIG. 4B, and FIG. 4C is a logical characterization of a method to arbitrate a coincidence between the measurement process and the random access process and may be said to grant precedence to the random access process over the measurement process. One skilled in the art will recognize that there may be multiple alternative ways to implement the steps depicted in the flow chart, for example to optimally use an electronic processor and/or limited memory efficiently. Additionally, minor modifications of the logical flow depiction would occur to those skilled in the art, for example trivial transpositions of functional blocks that do not alter the end result of the method. All such alternatives and modifications are contemplated by the present disclosure.

At block 304, if a random access process triggering event has occurred, the method 300 proceeds to block 312 where the random access process is started. If no random access process triggering event has occurred, the method 300 proceeds to block 308 where if a measurement process triggering event has occurred, the method 300 proceeds to block 314 where the measurement process is started. If no measurement process triggering event has occurred, the method 300 returns to block 304. In the absence of either a random access process triggering event or a measurement process triggering event, the method 300 continues to loop through blocks 304 and 308. While the logical description above suggests a busy waiting operation in the absence of any triggering events, one skilled in the art will readily recognize that the depicted logical operation can be trivially mapped to efficient codes, subroutines, and/or interrupt service routines which do not suffer from the inefficiency of busy waiting. For example, in an embodiment, one or both of the blocks 304, 308 may be implemented as an interrupt service routine that is invoked based on a triggering event.

If block 312 has been performed, the method 300 proceeds to block 318 in FIG. 4B. The logic depicted in FIG. 4B can be considered to be an operational state or mode of the UA 10, the state of the random access process in progress. At block 318 if a measurement process triggering event has occurred the method 300 proceeds to block 322 where the measurement process is not started. The method 300 then proceeds to block 326 where the random access process is performed. At block 330, if the random access process is done, the method 300 ends. At block 330, if the random access process is not done, the method 300 returns to block 318. By looping through blocks 318, 322, 326, and 330 the random access process is completed. The repeated looping is intended to convey the possibility of processing a plurality of instructions in the course of performing the random access process. One skilled in the art will readily appreciate that the blocks 318 and 322 may be dropped out of the method 300, for example if the random access process and the measurement process are implemented as interrupt service routines and the random access process is implemented as a higher priority than the measurement process.

In FIG. 4A, if block 314 has been performed, the method 300 proceeds to block 334 in FIG. 4C. The logic depicted in FIG. 4C can be considered to be an operational state or mode of the UA 10, the state of the measurement process in progress. At block 334, if a random access process triggering event has occurred the method 300 proceeds to block 346 where the measurement process is canceled and/or stopped. From block 346, the method 300 proceeds to block 326 in FIG. 4B, where the random access process is performed, as discussed above. If no random access process triggering event has occurred, the method 300 proceeds to block 338 where the measurement process is performed. The method 300 proceeds to block 342 where if the measurement process is done, the method 300 ends. If the measurement process is not done, the method 300 returns to block 334. By looping through blocks 334, 338, and 342, the measurement process is completed. The repeated looping is intended to convey the possibility of processing a plurality of instructions in the course of performing the measurement process.

As already mentioned above, one skilled in the art will recognize that the flow chart depicted in FIG. 4A, FIG. 4B, and FIG. 4C is a logical depiction of the processing that occurs. This logic can be implemented in code, subroutines, and/or interrupt service routines in a variety of ways to achieve processing and/or memory utilization efficiencies that are well known to those skilled in the embedded systems programming and wireless communications arts, all of which are contemplated by the present disclosure. Some suggestions are made above to indicate some of the differences that may occur between the logical depiction and the implementation in practical low-level code deployed on an electronic device, but considerations of brevity militate against an exhaustive enumeration of these alternatives, which in any case are well known in the art.

The functionality of method 300 may alternatively be stated succinctly as: when a measurement of radio conditions process is in progress and when a random access process triggering event occurs, cancel the measurement of radio conditions process and perform the random access process; and when the random access process is in progress and when a measurement of radio conditions process triggering event occurs, continue performing the random access process.

Turning now to FIG. 5A, FIG. 5B, FIG. 5C, and FIG. 5D, a method 350 is discussed. The method 350 may be said to provide a divided preference between the random access process and the measurement process. The flow chart provided in FIG. 5A, FIG. 5B, FIG. 5C, and FIG. 5D is a logical characterization of a method to arbitrate coincidence between the measurement process and the random access process. One skilled in the art will recognize that there may be multiple alternative ways to implement the steps depicted in the flow chart, for example to optimally use an electronic processor and/or limited memory efficiently. Additionally, minor modifications of the logical flow depiction would occur to those skilled in the art, for example trivial transpositions of functional blocks that do not alter the end result of the method. All such alternatives and modifications are contemplated by the present disclosure.

At block 352, if a random access process triggering event has occurred, the method 350 proceeds to block 356 where the random access process is started. If no random access process triggering event has occurred, the method 350 proceeds to block 354 where if a measurement process triggering event has occurred, the method 350 proceeds to block 358 where the measurement process is started. If no measurement process triggering event has occurred, the method 350 returns to block 352. In the absence of either a random access process triggering event or a measurement process triggering event, the method 350 continues to loop through blocks 352 and 354. While the logical description above suggests a busy waiting operation in the absence of any triggering events, one skilled in the art will readily recognize that the depicted logical operation can be trivially mapped to efficient codes, subroutines, and/or interrupt service routines which do not suffer from the inefficiency of busy waiting. For example, in an embodiment, one or both of the blocks 352, 354 may be implemented as an interrupt service routine that is invoked based on a triggering event.

Figure 5A:
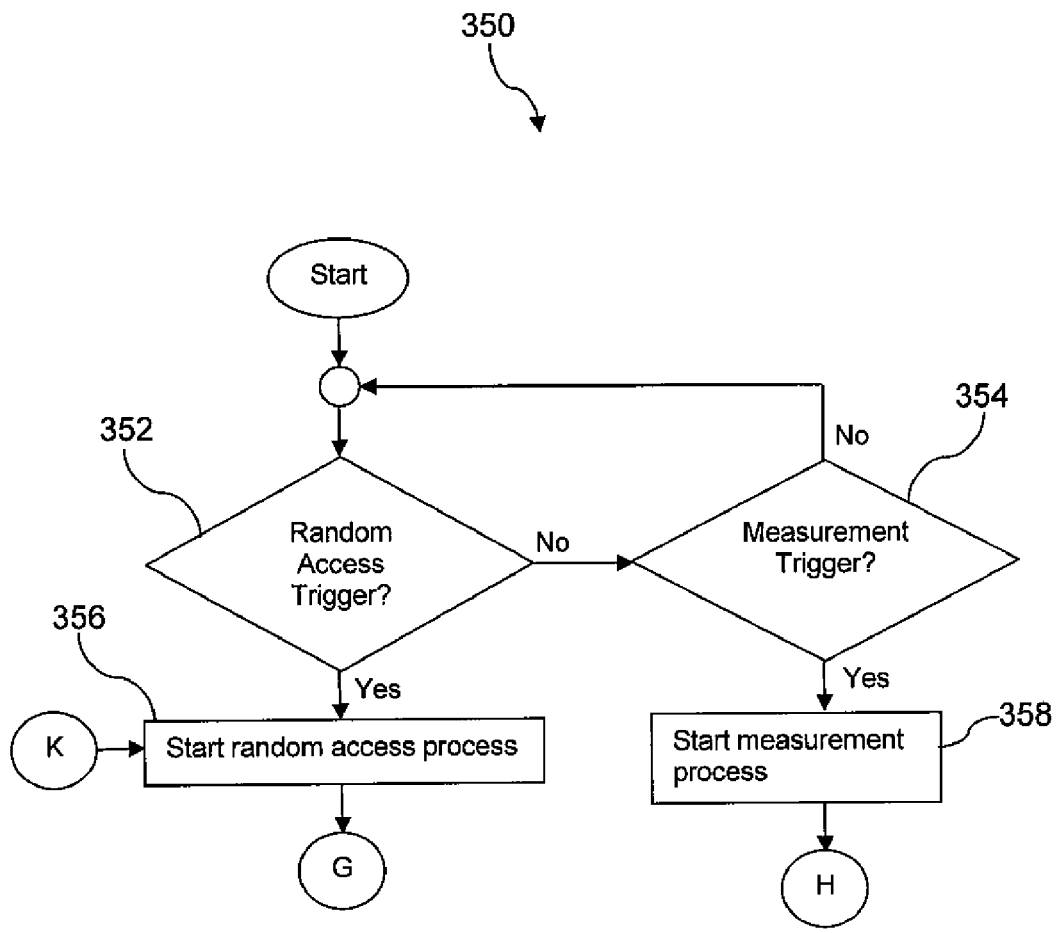
FIG. 5A, FIG. 5B, FIG. 5C, and FIG. 5D depict a flow chart of yet another method according to an embodiment of the disclosure.
Figure 5B:
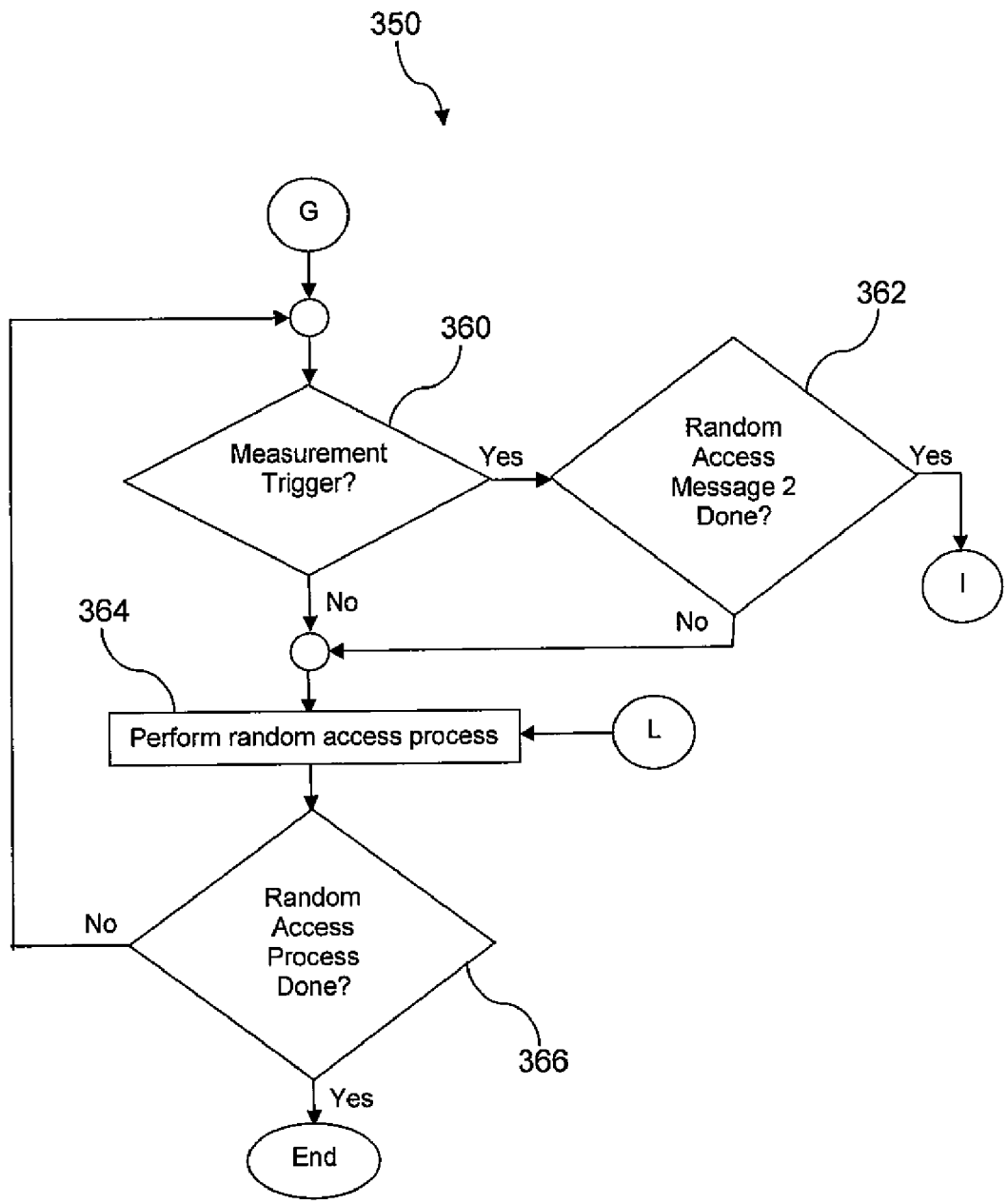

If block 356 has been performed, the method 350 proceeds to block 360 in FIG. 5B. At block 360, if a measurement process triggering event has not occurred the method 350 proceeds to block 364 where the random access process is performed. At block 366, if the random access process has completed, the method 350 ends. At block 366, if the random access process has not completed, the method returns to block 360. By looping through blocks 360, 364, and 366 the random access process is completed.

At block 360, if a measurement process triggering event has occurred, the method 350 proceeds to block 362. At block 362, if the random access process has not completed handling the second message, for example the random access process has not received the random access response message, the process 350 returns to block 364, otherwise the process 350 proceeds to block 374 in FIG. 5D. At block 374, the measurement process is performed. At block 376, if the measurement process is not completed, the process 350 returns to block 374. By looping through blocks 374 and 376 the measurement process is completed. At block 376, if the measurement process is completed, the method 350 returns to block 364 in FIG. 5B, where the random access process is performed and the remaining steps and/or messages associated with the random access procedure and/or process are handled.

Figure 5C:
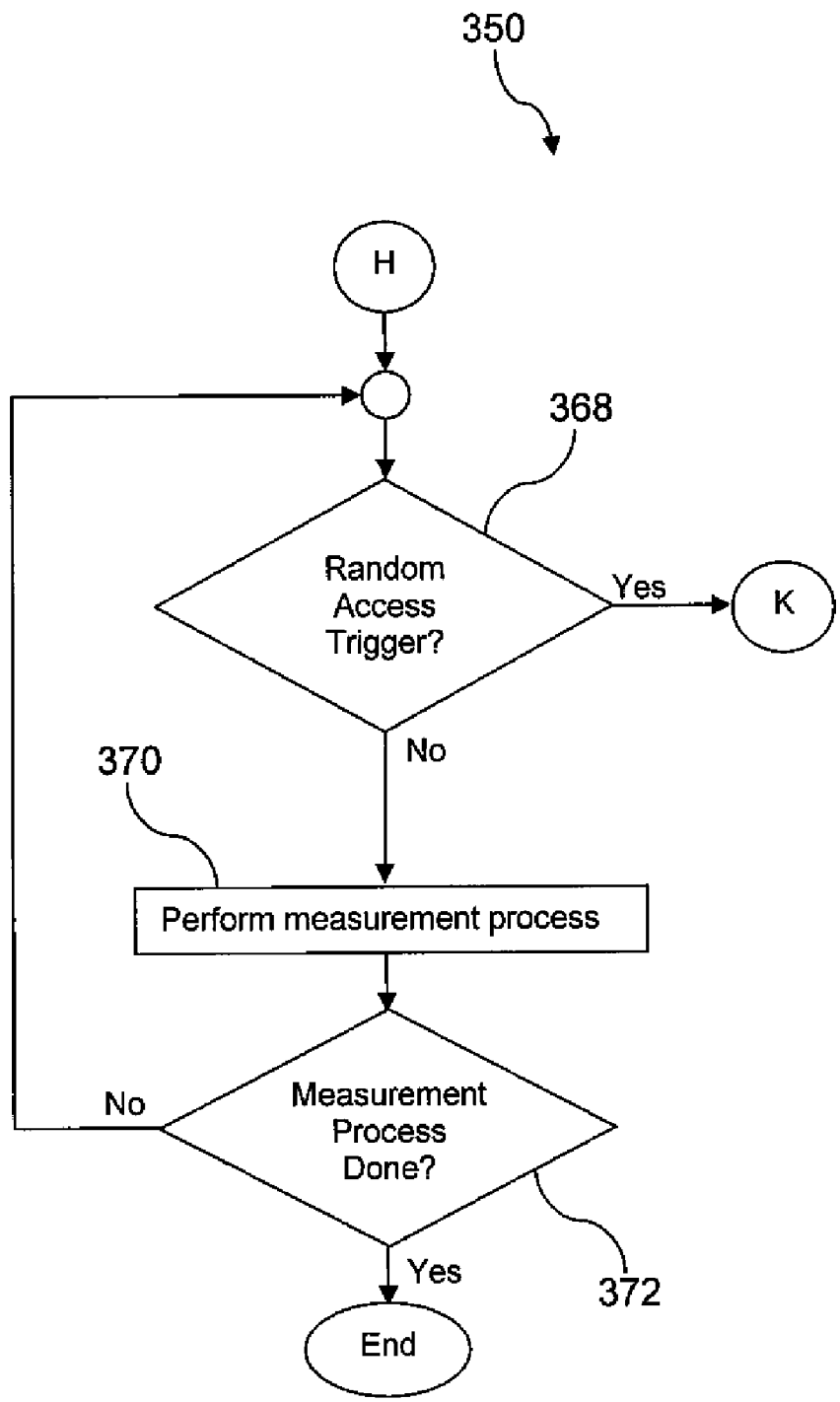
Figure 5D:
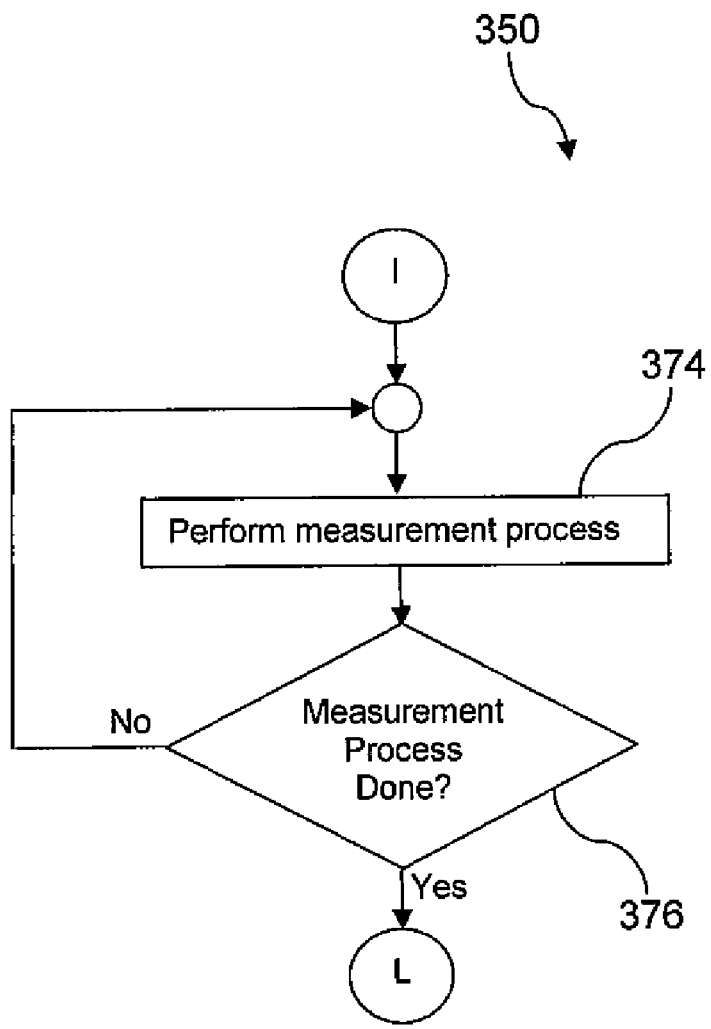

With reference again to FIG. 5A, if block 358 has been performed, the process 350 proceeds to block 368 in FIG. 5C. In block 368, if a random access process triggering event has occurred, the process 350 returns to block 356 in FIG. 5A, otherwise the process 350 proceeds to block 370 where the measurement process is performed. At block 372, if the measurement process is completed, the method 350 ends, otherwise the process 350 returns to block 368. By looping through blocks 368, 370, and 372 the measurement process is completed.

As already mentioned above, one skilled in the art will recognize that the flow chart depicted in FIG. 5A, FIG. 5B, FIGS. 5C, and 5D is a logical depiction of the processing that occurs. This logic can be implemented in code, subroutines, and/or interrupt service routines in a variety of ways to achieve processing and/or memory utilization efficiencies that are well known to those skilled in the embedded systems programming and wireless communications arts, all of which are contemplated by the present disclosure.

The functionality of method 350 may alternatively be stated succinctly as: when a user agent is in progress of performing a measurement of radio conditions process and when a random access process triggering event occurs, the user agent cancels the measurement of radio conditions and starts a random access procedure; when the user agent is in progress of performing the random access process, when a measurement of radio conditions process triggering event occurs, and when the random access process has completed handling a random access response, the user agent stops the random access process, the user agent starts the measurement of radio conditions process, the user agent completes the measurement of radio conditions process, and the user agent resumes the random access process; and when the user agent is in progress of performing the random access process, when the measurement of radio conditions trigger event occurs, and when the random access process has not completed handling the random access response, the user agent continues the random access process.

Figure 6:
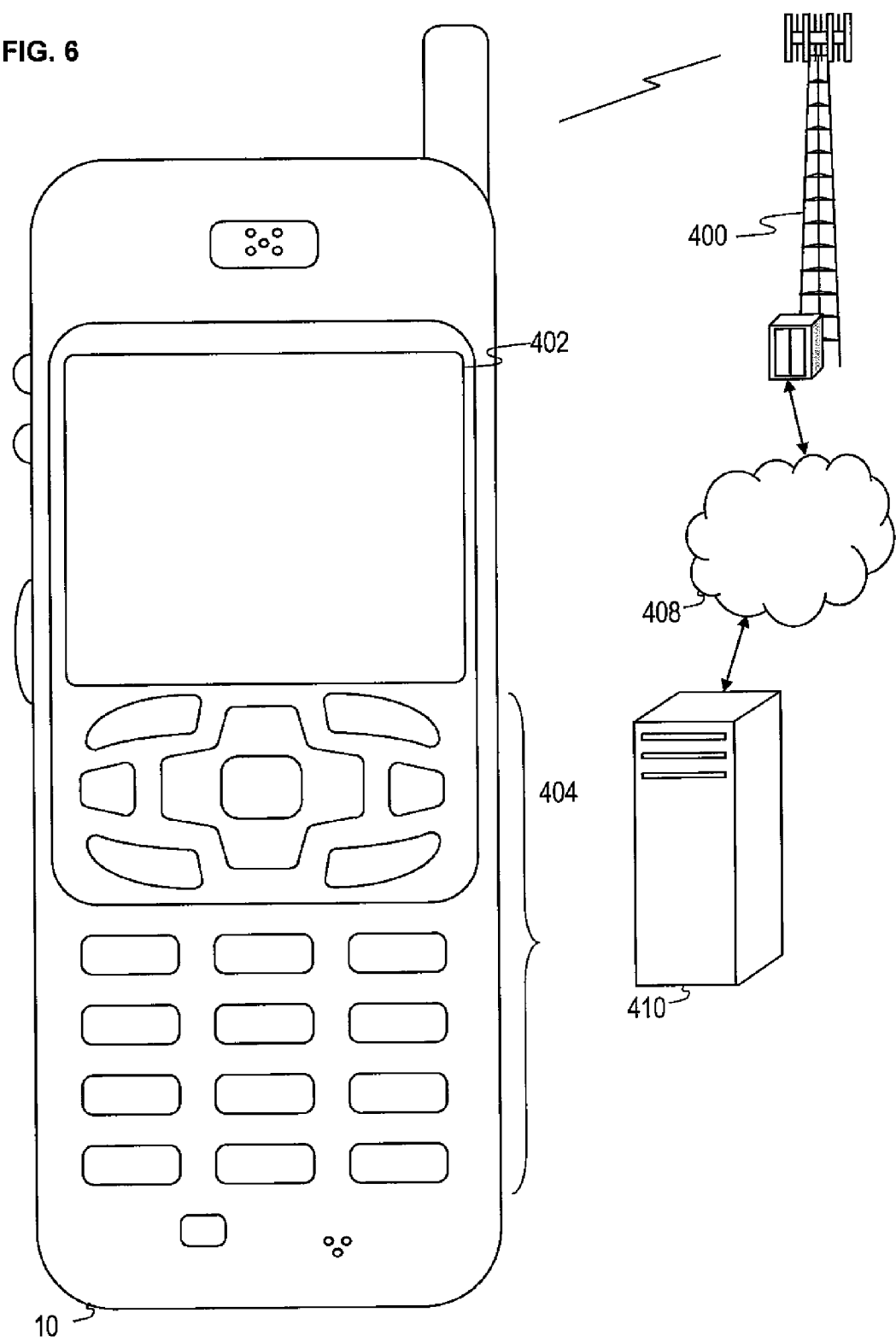
FIG. 6 is a diagram of a wireless communications system including a user agent operable for some of the various embodiments of the disclosure.

FIG. 6 illustrates a wireless communications system including an embodiment of the UA 10. The UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, or a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UA 10 may be a portable, laptop or other computing device. The UA 10 may support specialized activities such as gaming, inventory control, job control, and/or task management functions, and so on.

The UA 10 includes a display 402. The UA 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 402 to show a web page. The web page may be obtained via wireless communications with a wireless network access node, a cell tower, a peer UA 10, or any other wireless communication network or system 400. The network 400 is coupled to a wired network 408, such as the Internet. Via the wireless link and the wired network, the UA 10 has access to information on various servers, such as a server 410. The server 410 may provide content that may be shown on the display 402. Alternately, the UA 10 may access the network 400 through a peer UA 10 acting as an intermediary, in a relay type or hop type of connection.

Figure 7:
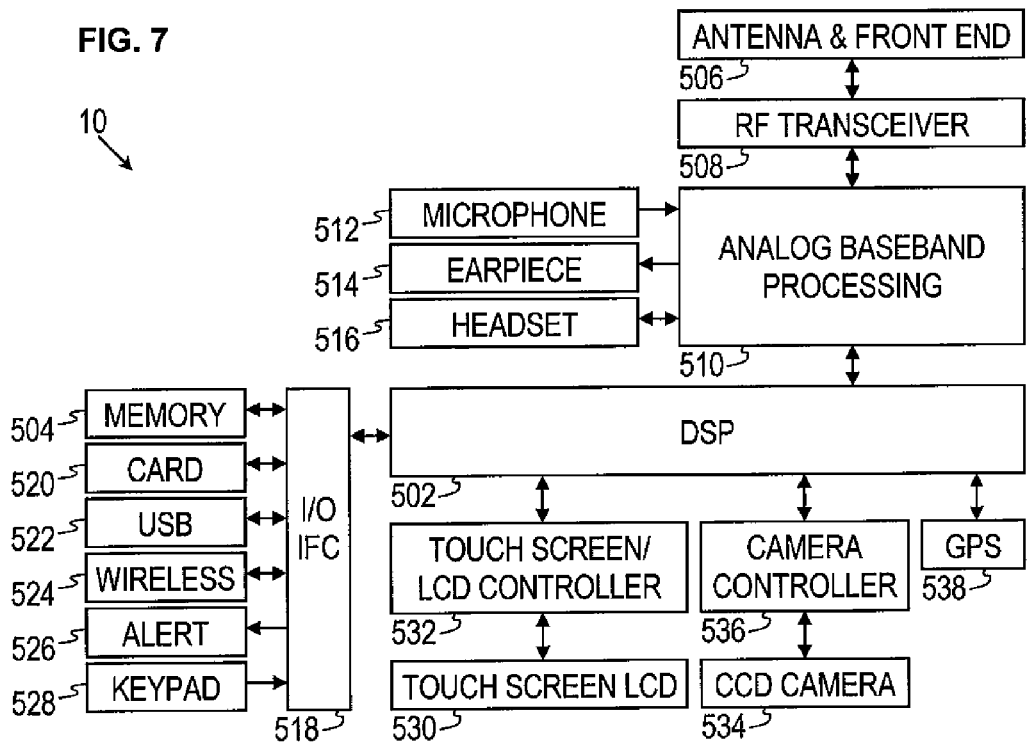
FIG. 7 is a block diagram of a user agent operable for some of the various embodiments of the disclosure.

FIG. 7 shows a block diagram of the UA 10. While a variety of known components of UAs 10 are depicted, in an embodiment a subset of the listed components and/or additional components not listed may be included in the UA 10. The UA 10 includes a digital signal processor (DSP) 502 and a memory 504. As shown, the UA 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UA 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UA 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UA 10 to send and receive information from a cellular network or some other available wireless communications network or from a peer UA 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UA 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UA 10 and may also enable the UA 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 518 may further connect the DSP 502 to the alert 526 that, when triggered, causes the UA 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UA 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UA 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UA 10 to determine its position. Various other peripherals may also be included to provide additional functions, e.g., radio and television reception.

Figure 8:
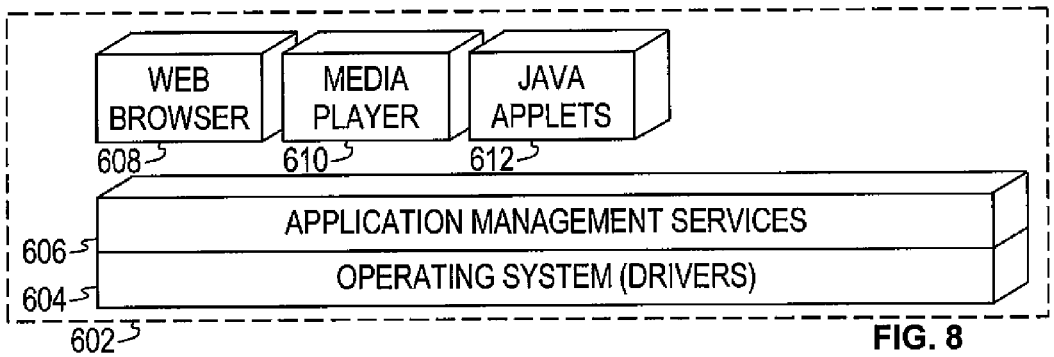
FIG. 8 is a diagram of a software environment that may be implemented on a user equipment operable for some of the various embodiments of the disclosure.

FIG. 8 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UA 10. Also shown in FIG. 6 are a web browser application 608, a media player application 610, and Java applets 612. The web browser application 608 configures the UA 10 to operate as a web browser, allowing a user to enter information into forms and select links to retrieve and view web pages. The media player application 610 configures the UA 10 to retrieve and play audio or audiovisual media. The Java applets 612 configure the UA 10 to provide games, utilities, and other functionality.

Figure 9:
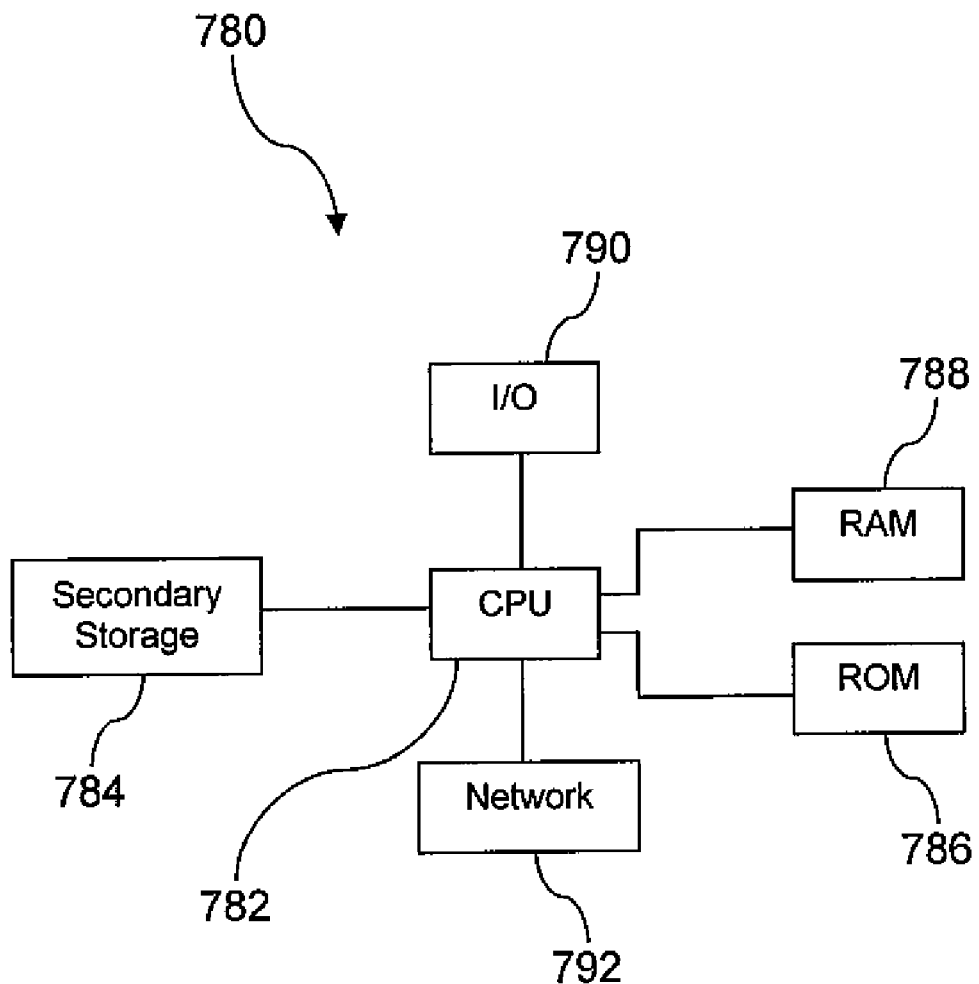
FIG. 9 illustrates an exemplary general-purpose computer system suitable for implementing the several embodiments of the disclosure.

Portions of the system 8 described above, for example the access device 20, may be implemented on any general-purpose computer with sufficient processing power, memory resources, and network throughput capability to handle the necessary workload placed upon it. FIG. 9 illustrates a typical, general-purpose computer system suitable for implementing one or more aspects of the embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave. The network connectivity devices 792 may also include one or more transmitter and receivers for wirelessly or otherwise transmitting and receiving signal as are well know to one of ordinary skill in the art.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

The following are incorporated herein by reference for all purposes: $3^{rd}$ Generation Partnership Project (3GPP) Technical Specifications (TS) 36.321 and 36.300.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user agent (UA) configured to perform a random access procedure and to perform radio measurements, wherein the random access procedure comprises:
   deciding when to send a random access preamble based on a possible occurrence of a measurement gap;
   transmitting a random access preamble on an uplink; and
   monitoring a physical downlink control channel for a random access response, and
   wherein, the user agent is configured to resolve a coincidence of a random access procedure message exchange and the radio measurements if the radio measurements are in progress at the time that the random access procedure is initiated then canceling the radio measurements and performing the random access procedure and if the random access procedure is in progress at the time a radio measurement process triggering event occurs the postponing the radio measurements.

2. The user agent of claim 1, wherein the user agent performs the radio measurements periodically.

3. The user agent of claim 1, wherein the radio measurements comprise at least one of a plurality of inter-radio access technology (inter-RAT) measurements and a plurality of inter-frequency measurements.

4. The user agent of claim 3, wherein the inter-radio access technology measurements comprise measurements of at least one of code division multiple access (CDMA) technology conditions, global system for mobile communications (GSM) technology conditions, universal mobile telecommunication system (UMTS) technology conditions, and long term evolution (LTE) technology conditions.

5. The user agent of claim 3, wherein the radio measurements comprise measurements of a plurality of pilot signals transmitted by a plurality of access devices.

6. The user agent of claim 1, wherein the random access procedure comprises the user agent transmitting the random access preamble on an uplink, monitoring a physical downlink control channel for a random access response, transmitting a first contention resolution message on the uplink, and receiving a second contention resolution message on the downlink.

7. The user agent of claim 6, wherein the user agent is configured to resolve a coincidence of a random access procedure message exchange and the radio measurements by giving precedence to both the transmitting the random access preamble on the uplink and monitoring the physical downlink control channel for the random access response over performing the radio measurements and by giving precedence to performing the radio measurements over both transmitting the first contention resolution message on the uplink and receiving the second contention resolution message on the downlink.

8. A method of wireless communication, comprising:
a user agent (UA) performing radio measurements; and
the user agent performing a random access procedure, wherein the random access procedure comprises deciding when to send a random access preamble based on a possible occurrence of a measurement gap, transmitting a random access preamble on an uplink, and monitoring a physical downlink control channel for a random access response, and
wherein, the user agent is configured to resolve a coincidence of a random access procedure message exchange and the radio measurements if the radio measurements are in progress at the time that the random access procedure is initiated then canceling the radio measurements and performing the random access procedure and if the random access procedure is in progress at the time a radio measurement process triggering event then postponing the radio measurements.

9. The method of claim 8, wherein the user agent performs the radio measurements periodically.

10. The method of claim 8, wherein the radio measurements comprise at least one of a plurality of inter-radio access technology (inter-RAT) measurements and a plurality of inter-frequency measurements.

11. The method of claim 10, wherein the inter-radio access technology measurements comprise measurements of at least one of code division multiple access (COMA) technology conditions, global system for mobile communications (GSM) technology conditions, universal mobile telecommunication system (UMTS) technology conditions, and long term evolution (LTE) technology conditions.

12. The method of claim 10, wherein the radio measurements comprise measurements of a plurality of pilot signals transmitted by a plurality of access devices.

13. The method of claim 8, wherein the random access procedure comprises the user agent transmitting the random access preamble on an uplink, monitoring a physical downlink control channel for a random access response, transmitting a first contention resolution message on the uplink, and receiving a second contention resolution message on the downlink.

14. The method of claim 13, wherein the user agent is configured to resolve a coincidence of a random access procedure message exchange and the radio measurements by giving precedence to both the transmitting the random access preamble on the uplink and monitoring the physical downlink control channel for the random access response over performing the radio measurements and by giving precedence to performing the radio measurements over both transmitting the first contention resolution message on the uplink and receiving the second contention resolution message on the downlink.

* * * * *